United States Patent [19]

Mohr

[11] 4,266,855
[45] May 12, 1981

[54] QUICK CHANGE LENS SYSTEM

[75] Inventor: Siegfried H. Mohr, Santa Clara, Calif.

[73] Assignee: Quantor Corporation, Mountain View, Calif.

[21] Appl. No.: 78,420

[22] Filed: Sep. 24, 1979

[51] Int. Cl.³ ............... G02B 7/16; G03B 21/14; G03B 27/52
[52] U.S. Cl. .................. 350/254; 350/257; 353/101; 355/55; 355/61
[58] Field of Search ............ 350/39, 254, 257, 239; 353/76, 101; 355/44–45, 55, 61

[56] References Cited

U.S. PATENT DOCUMENTS 3,458,706  7/1969  Ravenhall et al. ............ 250/231 R

FOREIGN PATENT DOCUMENTS 2758479  7/1978  Fed. Rep. of Germany ........... 350/239

Primary Examiner—Vincent P. McGraw
Assistant Examiner—Wm. H. Punter
Attorney, Agent, or Firm—J. T. Cavender; Wilbert Hawk, Jr.; George J. Muckenthaler

[57] ABSTRACT

A lens nesting member carries a plurality of lenses in position to enable rapid selection of a desired lens and photoelectric means is provided for sensing and for identifying the desired lens.

12 Claims, 8 Drawing Figures

| 24X | 42X | 48X | 72X |
|---|---|---|---|
| 0 | 1 | 0 | 1 |
| 0 | 0 | 1 | 1 |
| BLACK BLACK | WHITE BLACK | BLACK WHITE | WHITE WHITE |

QUICK CHANGE LENS SYSTEM

BACKGROUND OF THE INVENTION

In the field of optical systems wherein a lens is utilized for magnifying certain information, it is important that the lens be positioned and maintained in such position to provide proper focusing of the lens for reading the information. In the case of a projection-type lens, it is advisable to use a high-efficiency lamp along with a high-resolution lens to obtain optimum operating conditions.

Since proper focusing of the optical system is extremely important, various ways and means have been utilized for moving the lens along the axial direction in relation to an optical plane. One well-known method is to adjust the position of the lens along its optical axis by camming means which includes structure whereby the lens and associated barrel of the lens system are axially moved in relation to the film or focal plane. Another method may use bevel surfaces in the nature of a helical curve whereby a pin or like member is caused to be moved along the curve for adjusting the lens in a manner to provide proper focusing thereof. In a number of these systems, it is usually required to re-focus the lens system upon reading of different information on microfilm or the like or when such film is caused to be replaced in film viewing apparatus.

Additionally, a lens may be positioned and retained in a system which includes structure for securing the lens in a manner to avoid repeated refocusing of the lens and such structure may be designed to make fast and simple changing of the lens which is then in the apparatus for a lens of a different magnification. Lens mounting systems have included bayonet-type structures but also use intricate machining to obtain a spring-effect to hold the lens against a defined surface as is the case in many of the lens mountings for cameras.

In the case of a viewer or reader for accommodating microfilm or microfiche, it is well-known that the reduction ratio of such readers may vary, for example, from 24 to 150 times and also the image size on the microform itself may vary. Because of these variations, it becomes advisable to have available a number of lenses of different magnification values rather than a plurality of readers with different reduction ratios.

The use of different magnification lenses in a specific reader or like apparatus presents a problem of maintaining focus when the lenses are interchanged to accommodate a microfiche or microfilm of like ratio. Additionally, it becomes necessary to provide structure which enables changing or replacing lenses in the shortest possible time. A plurality of lenses may be stored near the apparatus of the apparatus itself may carry the lenses in a manner whereby a specific lens may be selected from a group of lenses.

Representative prior art of selecting a lens from a lens-carrying member includes U.S. Pat. No. 3,640,621, issued to R. Frerson et al. on Feb. 8, 1972, which discloses apparatus wherein a plurality of lens systems are mounted on a turret for positioning any one of them to focus the image of a microform onto a screen or the plane of a copier. A servo mechanism is provided for positioning any one of the lens systems.

SUMMARY OF THE INVENTION

The present invention relates to computer output microfilm (COM) systems and more particularly, to a mounting for a plurality of projection lenses or the like providing for a quick change method of lens selection for lenses of different magnification. One such COM system includes the use of a microfiche recorder of the type disclosed in U.S. Pat. No. 4,175,854 issued to S. K. Ammann et al. The mounting employs structure which facilitates rapid selection of lenses and provides support levels which retain and maintain a continuity of position for the several lenses so as to be in proper focus when a different lens is brought into position for utilization.

The structure of the present invention includes a lens nesting or storage wheel which carries a plurality of lenses and which is supported in a manner to be rotated for selecting the proper lens. A lens clamping ring cooperates with a lens mounting ring to urge a lens-holding bayonet against a reference or supporting member to maintain the lens in a focus condition. The lens-holding bayonet has a plurality of lugs on the periphery at one end thereof and the lens clamping ring is a one-piece planar spring which is in engagement with the lugs for enabling the bayonet to provide an urging or biasing action thereagainst.

The lens nesting wheel carries or stores four lenses, each of which is included in an encoding system having a pair of proximity sensors adjacent the periphery of the wheel for detecting lens position indicia represented by reflective or non-reflective (absorptive) tape attached to the periphery of the wheel so as to provide a signal or pulse, in the nature of a two-bit binary code, to a control system to identify and/or verify that a certain lens is in the desired or proper position.

In view of the above discussion, the principal object of the present invention is to provide a simple and low-cost method for enabling the quick changing of lenses.

An additional object of the present invention is to provide a single piece resilient element for urging or biasing the lens-supporting structure in one direction.

Another object of the present invention is to provide a plurality of lenses carried in a storage member with each of the lenses being biased by a single piece resilient element a controlled amount to maintain each lens in a precise, focused position upon selection of the desired lens.

A further object of the present invention is to provide a member for rotatably carrying a plurality of lenses and means for sensing the position of the selected lens for verifying the position thereof.

Additional advantages and features of the present invention will become apparent and fully understood from a reading of the following description taken together with the annexed drawing.

DETAILED DESCRIPTION OF THE INVENTION

Figure 1:
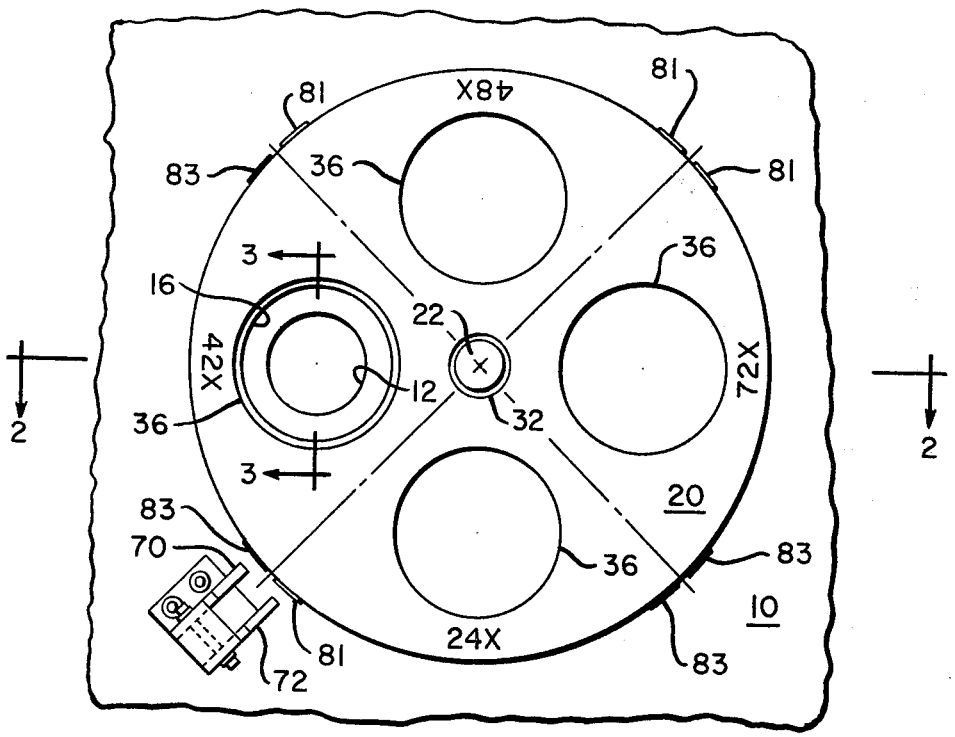
FIG. 1 is a plan view of the underside of the lens-carrying member of the present invention.
Figure 2:
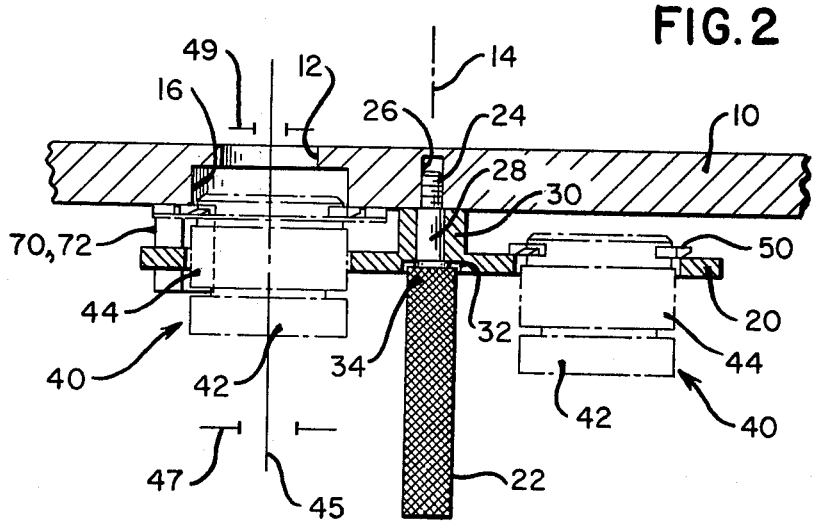
FIG. 2 is a sectional view taken along the plane 2—2 of FIG. 1.
Figure 3:
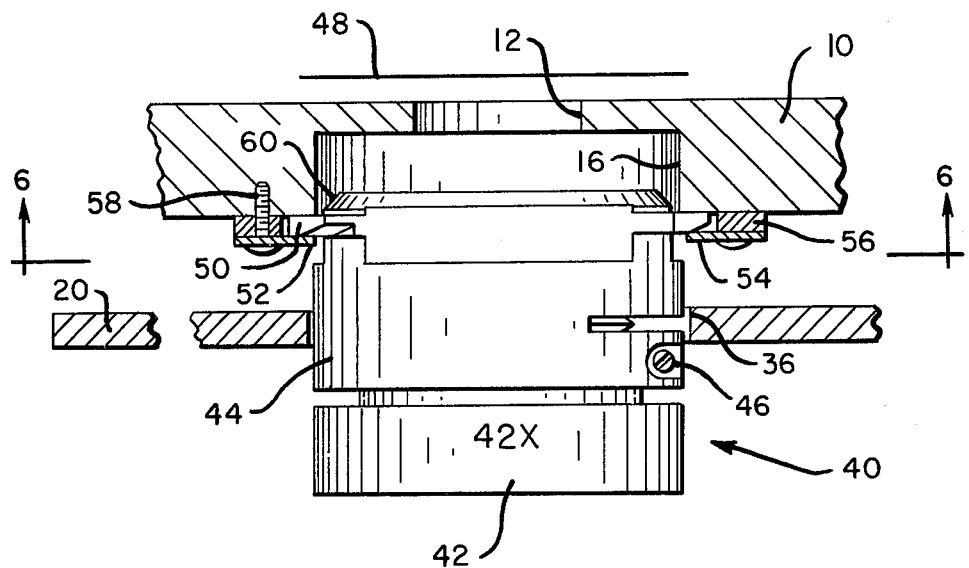
FIG. 3 is an enlarged elevational view taken on plane 3—3 of FIG. 2, and showing a lens assembly supported against a reference member.

Referring to FIGS. 1, 2 and 3 of the drawing, a reference or support member 10 is provided to carry a plurality of lens assemblies, the member 10 being in the form of a planar plate and having an aperture 12 located in offset manner from a center reference point 14. The aperture 12 is of a certain diameter and connects with a counter-aperture 16 of larger diameter.

A lens nesting or storage member 20 in the form of a circular plate or wheel is rotatably attached to and supported from the underside of the support member 10 by means of a mounting element 22, which has a threaded portion 24 at one end thereof for threading into a drilled-and-tapped hole 26 in the support plate 10. A shoulder screw 28 forms a portion of and is press fitted into the top of the element 22 and the screw 28 is slidably received in a hub portion 30 of the storage member 20, and an enlarged diameter portion of the mounting element 22 is knurled so as to provide a hand grip for attaching the nesting wheel 20 to the support plate 10 and enable such nesting wheel to be maintained at a precise rotational operating condition. The threaded portion 24 of screw 28 is precisely formed so that the mounting element 22 is tight and secure with respect to the support plate 10, while allowing a bearing surface at the junction of the lower surface of the support plate 10 and the upper surface of the hub portion 30, and at the junction of a lower surface of the wheel 20 and an upper surface of the mounting element 22.

The nesting wheel 20 has a central recess 32 for receiving the upper end portion 34 of the mounting element 22 and has four equally spaced and circularly aligned apertures 36 therethrough (FIG. 1) for receipt of a lens assembly 40 in each instance. As seen in FIG. 3, the lens assembly 40 includes a lens holder 42 adapted to enclose and retain a particular lens (not shown) of a stated magnification. Such holder 42 has threads on a peripheral portion thereof for engaging with threads on an internal diameter of a male bayonet or barrel 44, which bayonet is provided with screw means 46 or the like for tightening adjacent portions of the bayonet separated by suitable kerfs (only one shown) so as to precisely position and retain the lens holder 42 in relation to the bayonet 44. The kerfs permit the internal (threaded) diameter of the bayonet 44 to be elastically deformed by the screw 46 to clamp the lens holder 42. The particular lens is set for proper focus relative to a microimage plane 48 above the lens assembly 40 and, when the critical focus of the lens is established and set, the focus condition will remain until the lens assembly is removed from the support member 10.

The optical axis of the lens assembly 40 is shown as line 45 and an image mask 47 is placed in the optical path of and below the operating lens 40 (FIG. 2) when using a COM-recorder for recording microimages. The lens (not shown) essentially creates an "image" 49 of the mask 47 in the film recording plane, thus eliminating extraneous light from the image and the surrounding area.

Figure 6:
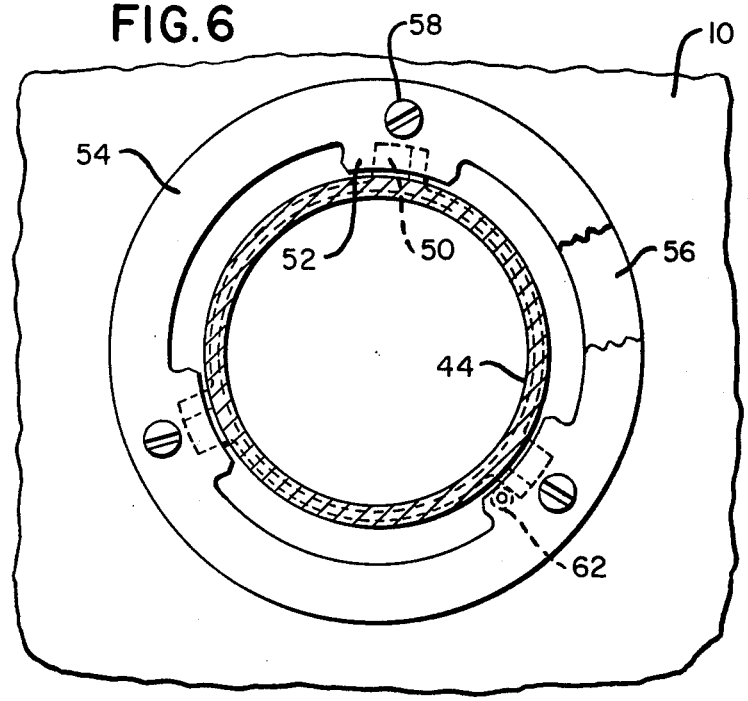
FIG. 6 is a view taken on the plane 6—6 of FIG. 3.

As shown in FIG. 3 and illustrated in detail in FIG. 6, the bayonet 44 has three equally-spaced lugs or tabs 50 extending outwardly to engage with corresponding resilient lug or tab portions 52 of a lens clamping ring or spring 54. The clamping ring or spring 54 is supported against a lens mounting ring 56 and is therewith affixed to the underside of the support plate 10 by means of screws 58. The offset aperture 12 of the support plate 10 allows for passage of projected light therethrough to the microimage plane 48 and the larger counter-aperture 16 of the plate 10 provides for easy entry and seating of a beveled nose portion 60 of the bayonet 44.

The lugs or tabs 50 of the bayonet 44 have a beveled entry angle of 15° and have a thickness of 0.095 inch for fitting in a recess or cavity of 0.085 inch formed by the lower surface of the reference plate 10 and the resilient portions 52 of the clamping spring 54. When the bayonet 44 is turned or rotated to engage the tabs or lugs 50 thereof with the spring 54, the interference fit of 0.010 inch requires the resilient portions 52 of spring 54 to push or bias the lens assembly 40 in an upward direction with controlled force. One of the lugs 50 engages against a stop pin 62. The bayonet-mounted lens assembly 4 is a precision device in that controlled spring pressure maintains the lens assembly against a reference surface for repeated operational positioning of the lens assembly.

Figure 4:
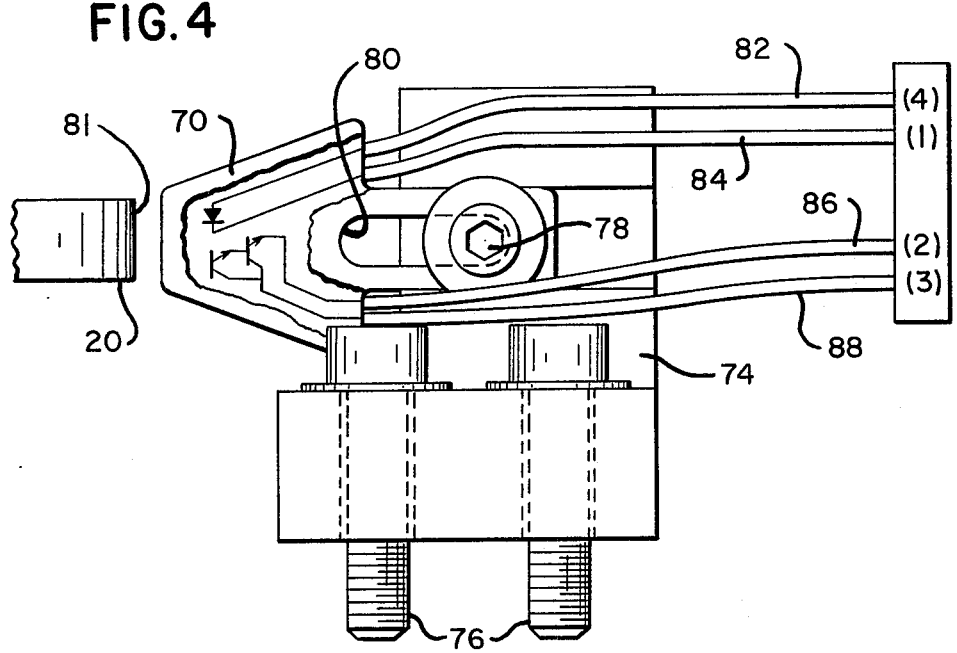
FIG. 4 is an enlarged side elevational view showing the lens position sensing means adjacent the lens-carrying member.
Figure 5:
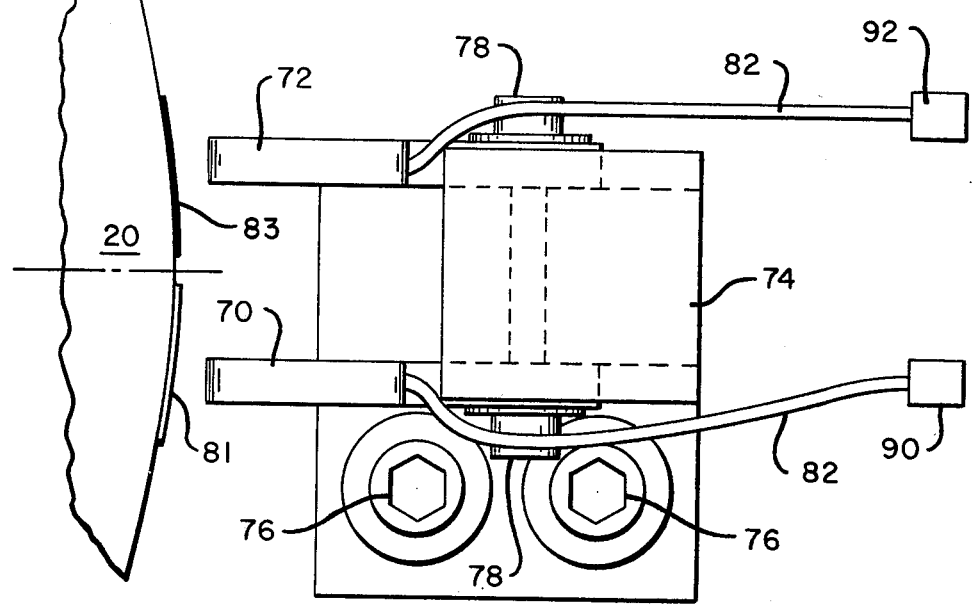
FIG. 5 is a plan view of the sensing means relative to the lens-carrying member.

Referring now to FIGS. 4 and 5, means is also provided for sensing the position of the lens nesting member 20 when the four lens assemblies 40 are carried in the four apertures 36 thereof and marked or identified as 24×, 42×, 48× and 72×. Such means for sensing includes a pair of object sensors 70 and 72, such as, for example, reflective sensors as manufactured by Optronic, Inc., of Carrollton, Tex., which sensors 70 and 72 are carried by an L-shaped bracket 74 in turn supported from the reference plate 10 by means of screws 76 in a location to place the sensors 70 and 72 adjacent the lens nesting wheel 20—shown in block form and oriented as per FIG. 1. The sensors 70 and 72 are mounted in tandem manner by a bolt or stud 78 through a slot 80 in each instance to provide a precise spacing therebetween. In the preferred embodiment, each of the sensors 70 and 72 consists of an infrared light-emitting diode and a silicon photodarlington sensor comprising a pair of associated photodiodes all in a common housing. The photodarlington sensor responds to radiation from the light-emitting diode only when a reflective object is within the field of view. The periphery of the lens nesting wheel 20 may have applied thereto between each of the respective lens assembly apertures 36, i.e. on the 45 degree angle, a length of photographic encoding tape or like material 81 providing a desired reflective quality to such wheel zone, such as, for example, reflective white opaque tape No. 267 as manufactured by 3M Company, for providing a reflecting surface having the property of ninety percent diffuse reflectance, or a length of photographic tape or like material 83, such as, for example photographic black opaque tape No. 235 of 3M Company for providing a non-reflecting or absorbing surface having a very black, dull surface with optical reflectance qualities comparable to a surface coated with carbon black printers ink. A line is scribed on the peripheral edge of the wheel 20 at all 90 degree positions and a prescribed length of the appropriate tape is placed on either side of the visible line.

The tape or like reflective material 81, 83 applied to the four locations of wheel 20 is the encoding in each instance by the respective magnification indicia of white and/or black tape for identifying the lens at that position on the wheel and the signals read therefrom by the sensors 70 and 72 are transmitted by leads 86 and 88 actuated by reflected or non-reflected light of the light-emitting diode of each sensor. An amplified signal from the photodarlington of each sensor goes out to terminal blocks 90 and 92 with further leads (not shown) being connected therefrom to the camera control mechanism (also not shown) included in the COM system. Leads 82 and 84 are connected to the diode of each sensor 70 and 72.

Figures 7, 8:
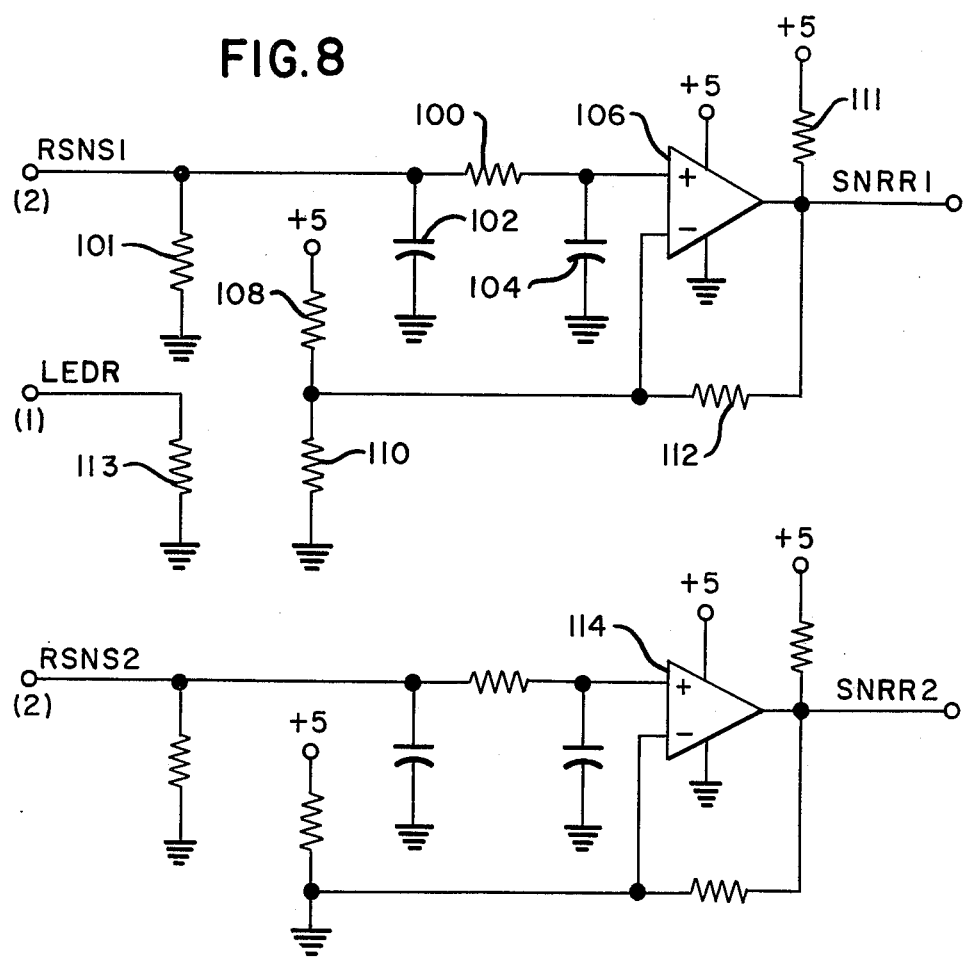
FIG. 7 is a table showing the encoding for the several lenses of different magnification.
FIG. 8 is a lens ratio reduction sensing circuit.

In FIG. 7 is shown the binary encoding table for the four levels of lens magnification and the associated colors of the strips of photographic tape on the periphery of the wheel 20. The reflective white opaque tape 81 and the non-reflective black opaque tape 83 provide indicia for the 24× lens as 0,0, for the 42× lens as 0,1, for the 48× lens as 1,0, and for the 72× lens as 1,1.

FIG. 8 shows a simple schematic circuit of the lens ratio reduction sensor with a signal RSNS1 generated through a network comprising a 1K resistor 100 connected between capacitors 102 and 104 of 0.1 fd along with a 4.7K resistor 101 as one input of an amplifier 106. The other input of the amplifier is generated through a network comprising 2.2K resistors 108 and 110, and a 100K resistor 112 is connected along with a 1K resistor 111 to an output SNRR1. An output SNRR2 is provided from amplifier 114 with similar circuitry as described above and originating with an input signal RSNS2. An LEDR signal is shown with a 220 ohm resistor 113.

In operation, the four lens assemblies 40 stored in the lens nesting wheel 20 may include, for example, lenses having magnification ratios of 24, 42, 48, and 72 to 1. Assuming that all four of such lens assemblies 40 are carried by the nesting wheel 20 in the lower position, as seen on the right in FIG. 2, the wheel 20 is rotated through turning thereof to that position which places the desired lens in alignment with the aperture 12 of the support member 10. The sensors 70 and 72 detect the tape or like material 81, 83 on the periphery of the wheel 20 associated with the desired lens assembly 40 and a binary identifying code is transmitted thereby to the control mechanism for programming the camera to operate in accordance with the magnification of the particular lens then in operating position.

Upon the wheel 20 reaching the desired position, the lens assembly 40 aligned with aperture 12 is manually elevated, whereby the beveled end 60 of the male bayonet 44 thereof becomes positioned in the larger diameter aperture 16. The lugs or tabs 50 of the bayonet 44 are oriented to pass over the lug or tab portions 52 of the spring 54 and the lens assembly is then turned or rotated approximately thirty-five degrees to engage the respective lugs 50 and tab portions 52 and to seat one of the bayonet lugs 50 against the stop pin 62, thereby precisely positioning the selected lens in relation to the microimage plane 48. As understood from FIG. 2, the three lens assemblies 40 not being utilized at such time are supported by means of the lugs or tabs 50 of the male bayonet 44 resting on the upper surface of the nesting wheel 20.

It is thus seen that herein shown and described is a lens-mounting system for carrying a plurality of lens assemblies in position to enable rapid and quick changing of a lens assembly and for signalling control mechanism that a particular lens is in position for operation. The lens-mounting system enables the accomplishment of the objects and advantages mentioned above, and while a preferred embodiment of the invention has been disclosed herein, variations thereof, especially in the wheel mounting, in the lens identification, and in the sensing, may occur to those skilled in the art. For example, the herein disclosed optical sensing of the lens assembly may be conveniently replaced with a magnetic sensing means or system or any one of many mechanical sensing means or systems employing notches, abutments, etc. for establishing positioning of the nesting wheel. Additionally, the sensed signals identifying the position of the desired lens assembly may be communicated to the camera control system by means other than the use of a simple binary code, as for example, by means of a counter. It is contemplated that all variations and modifications not departing from the spirit and scope of the invention hereof are to be construed in accordance with the following claims.

What is claimed is:

1. A lens mounting system for a microform viewer and/or recorder comprising:
    support means having an aperture therethrough,
    storage means spaced from said support means and adapted to carry a plurality of lens assemblies, each assembly positionable in alignment with said support means aperture,
    mounting means carrying said storage means and connected with said support means for enabling positioning of said storage means to position a selected one of said lens assemblies in alignment with said support means aperture,
    means including clamping means engageable by a selected lens assembly for positioning said selected one of said lens assemblies in relation to said support means for enabling focusing of the lens thereof, and
    means adjacent said storage means for identifying the selected one of said lens assemblies.

2. The system of claim 1 wherein said storage means is a rotatable member, said support means is a fixed member having means for receiving said mounting means, and said aperture is spaced radially from said receiving means.

3. The system of claim 1 wherein said storage means is a rotatable member having a plurality of apertures radially spaced from the center thereof for carrying said lens assemblies.

4. The system of claim 1 wherein each of said lens assemblies includes a plurality of lugs thereon for supporting said assembly in a storage position and for engaging with said support means when positioned by said positioning means to a focused position.

5. The system of claim 1 wherein said storage means includes optical sensing indicia thereon and said identifying means comprises optical apparatus for sensing said indicia.

6. The system of claim 1 wherein said support means is a plate member and said clamping means comprises a resilient member secured to said plate member and engageable by said selected lens assembly.

7. The system of claim 1 wherein said storage means is a rotatable member having reflective and non-reflective indicia on the periphery thereof and said identifying means comprises spaced optical apparatus for sensing said indicia.

8. A mounting system for a plurality of lens assemblies in a microform recorder, said system comprising a support plate having an aperture therethrough, a rotatable member carried by and spaced from said support plate and rotatable to place a desired one of said lens assemblies in alignment with the axis of said aperture, means including a clamping member biasing a selected lens assembly into engagement with said support means for positioning said selected one of said lens assemblies for enabling focusing of the lens of the selected assembly, and sensing means adjacent said rotatable member for identifying the selected lens assembly.

9. The system of claim 8 including a pivot member carried by said support plate on a reference point spaced from the axis of said aperture for permitting rotation of said rotatable member to any one of a plurality of lens assembly alignment positions.

10. The system of claim 9 wherein said rotatable member is a storage wheel having a plurality of apertures radially spaced from the reference point of said support plate for carrying said lens assemblies.

11. The system of claim 8 wherein each of said lens assemblies includes a plurality of lugs thereon for supporting said assembly in a non-operating position and for engaging with said support plate at said aperture when positioned for enabling focus of the selected lens in an operating position.

12. The system of claim 8 wherein said rotatable member includes reflective and non-reflective surfaces on the periphery thereof and said sensing means comprises optical apparatus for sensing the identity of the selected lens assembly.

* * * * *